(12) United States Patent
Hamilton

(10) Patent No.: US 7,506,111 B1
(45) Date of Patent: Mar. 17, 2009

(54) SYSTEM AND METHOD FOR DETERMINING A NUMBER OF OVERWITTEN BLOCKS BETWEEN DATA CONTAINERS

(75) Inventor: Eric Hamilton, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 492 days.

(21) Appl. No.: 11/017,026

(22) Filed: Dec. 20, 2004

(51) Int. Cl.
*G06F 12/00* (2006.01)

(52) U.S. Cl. ............... 711/156; 711/100; 707/100

(58) Field of Classification Search ............ 711/156
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,426,747 A | 6/1995 | Weinreb et al. |
| 5,581,724 A | 12/1996 | Belsan et al. |
| 6,636,879 B1 | 10/2003 | Doucette et al. |
| 2003/0182317 A1* | 9/2003 | Kahn et al. ............ 707/200 |
| 2004/0030668 A1* | 2/2004 | Pawlowski et al. ........ 707/1 |
| 2004/0267838 A1* | 12/2004 | Curran et al. ........... 707/204 |
| 2005/0086445 A1* | 4/2005 | Mizuno et al. .......... 711/162 |
| 2005/0246401 A1* | 11/2005 | Edwards et al. ......... 707/205 |

OTHER PUBLICATIONS

"Microsoft Computer Dictionary Fifth Edition", 2002, Microsoft Corporation, p. 213.*
Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner*—Kevin L Ellis
*Assistant Examiner*—Kalpit Parikh
(74) *Attorney, Agent, or Firm*—Cesari and McKenna LLP

(57) ABSTRACT

A system and method for quickly and efficiently determining the number of overwritten blocks between two data containers served by a storage system is provided. A novel vbnspace namespace is provided that is "parallel" to the file system (the "active" file system) and tracks location information (i.e., indirect block pointers) of level 0 data blocks within each data container, e.g., the active file system or a PCPI. The vbnspace namespace effectively eliminates the conventional level 0 data blocks from a storage viewpoint to thereby reduce the quantity of information needed to determine the number of overwritten blocks between the data containers.

31 Claims, 9 Drawing Sheets

OTHER PUBLICATIONS

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1990 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al., *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, 6/18-23/2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*, Reprinted from IBM Systems Journal vol. 20, No. 1, 1981© 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?(copy of article I have has no date or cite).

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al., *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical Integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *Rama:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al., *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles ( Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al., *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al., The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al., *Coda: A highly available file system for a distributed workstation environment* Carnegie Mellon University, CMU-ITC.

Satyanarayanan, M., et al., *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al., *Laddis: The next generation in NFS file server benchmarking*, USENIX Association Conference Proceedings, Apr. 1993.

* cited by examiner

SYSTEM AND METHOD FOR DETERMINING A NUMBER OF OVERWITTEN BLOCKS BETWEEN DATA CONTAINERS

FIELD OF THE INVENTION

The present invention relates to file systems and, in particular, to determining the number of overwritten level zero data blocks between two data containers.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server or "filer" including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. The data blocks are typically organized within a volume block number (vbn) space maintained by the file system. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein, and unless the context otherwise dictates can also mean a container, object or any other storage entity that does not correspond directly to a set of fixed data storage devices. A file system is, generally, a computer system for managing such files, including the allocation of fixed storage space to store files on a temporal or permanent basis.

The storage system may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Some known file systems contain the capability to generate a snapshot of the file system. In the example of a WAFL-based file system, snapshots are described in *TR3002 File System Design for a NFS File Server Appliance* by David Hitz, et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably throughout this patent without derogation of Network Appliance's trademark rights.

In the example of the Write Anywhere File Layout (WAFL™) file system, by Network Appliance, Inc., of Sunnyvale, Calif., a file is represented as an inode data structure adapted for storage on disks. FIG. 1 is a schematic block diagram illustrating an exemplary on-disk inode 100, which preferably includes a meta data section 110 and a data section 150. The information stored in the meta data section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The meta data section 110 further includes a xinode field 130 containing a pointer 140 that references another on-disk inode structure containing, e.g., access control list (ACL) information associated with the file or directory. The inode 100 may also include a set of flags 135 for tracking various metadata associated with the file. A level field 145 identifies how many levels of blocks are in the buffer tree associated with the file. Level 0 data blocks comprise the actual data blocks while level 1 blocks contain pointers to level 0 data blocks. Similarly, level 2 blocks contain pointers to level 1 blocks. The contents of the data section 150 of each inode may be interpreted differently depending upon the type of file (inode) defined within the type field 112. For example, the data section 150 of a directory inode contains meta data controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing 4 kilobyte (KB) data block on disk used to store the user data. Each pointer is preferably a logical volume block number which thereby facilitates efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect block that contains a plurality of pointers, each of which references a 4 KB data block on disk. An indirect block may include 510 or 1024 pointers in exemplary file systems. As the size of a file (or other data containers) represented by inode 100 increases, additional levels of blocks may be required to store the data.

A PCPI is a restorable version of a file system created at a predetermined point in time and stored on the same storage devices that hold the file system. PCPIs are generally created on some regular user-defined schedule. The PCPI is stored on-disk along with the active file system, and is retrieved into a buffer cache of the filer memory as requested by the storage operating system. An exemplary buffer tree data structure 200 is shown in FIG. 2. The inode for an inode file 205 contains information describing the inode file associated with a given file system. In this exemplary buffer tree the inode for the inode file 205 contains a pointer to an inode file indirect block 210. The inode file indirect block 210 contains a set of pointers to inode blocks 215, each typically contain ing multiple inodes 217, which in turn contain pointers to indirect blocks 219. The indirect blocks 219 include pointers to file data blocks 220A, 220B and 220C. Each of the file data blocks 220(A-C) is capable of storing, in the illustrative embodiment, 4 KB of data.

When the file system generates a PCPI of a given file system, a PCPI inode is generated as shown in FIG. 3. The PCPI (snapshot) inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

FIG. 4 shows an exemplary buffer tree data structure 400 after a file data block is modified. In this illustrative example, file data block 220C is modified to file data block 220C'. In response, the contents of the modified file data block are written to a new location on disk as a function of the exemplary WAFL file system. Because of this new location, the indirect block 419 is rewritten. Due to this changed indirect block 419, the inode 417 is rewritten. Similarly, the inode file indirect block 410 and the inode for the inode file 405 are rewritten. Thus, after a file data block has been modified the PCPI inode 305 contains a pointer to the original inode file indirect block 210 which, in turn, contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that metadata (not shown) stored in any snapshotted blocks (e.g., 305, 210, and 220C) protects these blocks from being recycled or overwritten until they are released from all PCPIs. Thus, while the active file system inode for the inode file 405 points to new blocks 220A, 220B and 220C', the old blocks 210, 217, 219 and 220C are retained until the PCPI is fully released.

After a PCPI has been created and file data blocks modified, the file system can reconstruct or "restore" the file system inode structure as it existed at the time of the PCPI by accessing the PCPI inode. By following the pointers contained in the PCPI inode 305 through the inode file indirect block 210, inode 217 and indirect block 219 to the unmodified file data blocks 220A-C, the file system can reconstruct the file system as it existed at the time of creation of the PCPI.

In a typical storage system configuration, an administrator schedules PCPIs to be generated at routine intervals, for example, once a day. By utilizing the restoration capabilities of the PCPI, the file system may be restored to a point in time represented by any saved PCPI. However, an administrator may desire to know the rate of change of data in the time intervals between PCPIs. In this context, rate of change may be illustratively defined as the number of level zero data blocks modified per unit time. Such rate of change information may be desirous when determining the frequency of PCPIs or the amount of storage space associated with a particular file system. For example, if a large percentage of the data contained within a PCPI is overwritten in the interval between generation of PCPIs, the storage space required to maintain a given number of PCPIs and the active file system is substantially more than if only a small percentage of the space is overwritten due to the space conservative nature of PCPIs.

However, there exists no efficient mechanism for quickly determining the rate of change of data between two data containers, e.g. two PCPIs or the active file system and a PCPI. Conventional "brute force" comparisons, which require block-by-block comparison of all level 0 data blocks, are computationally intensive and require that each data block of both data containers be retrieved from disk. This generates a substantial load on the disk subsystem, requiring repeated data retrieval operations. Data may be retrieved in multi-block chunks to reduce the number of individual disk operations; however, the computational cost of comparing all of the data in the two data containers remains high. For example, to compare the changes between two data containers, such as the active file system and a PCPI, the entire active file system must be retrieved from disk. If the active file system is hundreds (or thousands) of gigabytes in size, the time required to retrieve the data is prohibitively high.

SUMMARY OF THE INVENTION

The disadvantages of the prior art are overcome by providing a system and method for quickly and efficiently determining the number of overwritten blocks between two data containers served by a storage system. The rate of data change is determined by analyzing changes to level 0 data blocks in a file system executing on the storage system, which is configured to support PCPIs. A novel vbnspace namespace is provided that is "parallel" to the file system (the "active" file system) and tracks location information (i.e., indirect block pointers) of level 0 data blocks within each data container, e.g., the active file system or a PCPI. As used herein the term "namespace" denotes a unified view of storage resources on the storage system. The vbnspace namespace effectively eliminates the conventional level 0 data blocks from a storage viewpoint to thereby reduce the quantity of information needed to perform the rate of change analysis. This, in turn, reduces the time needed to retrieve such information. The vbnspace namespace is illustratively accessed via a novel vbnspace special directory from a root directory of the active file system and replicates the active file system and associated PCPIs. Thus a file being accessed using, for example, the NFS protocol as, e.g., /foo/bar/file may be accessed in the vbnspace as /vbnspace/foo/bar/file.

By accessing a file or data container through the vbnspace, the file system reduces the levels of an associated buffer tree by 1, essentially rendering the conventional level 1 blocks, which typically contain pointers to the level 0 data blocks, as vbnspace level 0 blocks. A data container typically includes orders of magnitude fewer level 1 blocks than level 0 blocks; by rendering the vbnspace level 0 blocks as data blocks, a block-by-block comparison may be performed quickly to detect changes between two data containers. Similar to the conventional level 1 blocks, the vbnspace level 0 data blocks contain pointers, and any change in the pointers signifies a change in the underlying level 0 data blocks.

In the illustrative embodiment, the vbnspace namespace is generated in-memory by the file system, resulting in no modifications to the on-disk structure of the data. A monitoring application executing on a client of the storage system may access the vbnspace namespace using conventional file or block access protocols. Each individual data block of the file, which represents a vbnspace level 0 block (conventional level 1 block), may be retrieved using conventional protocol read operations. By comparing the contents of the vbnspace level 0 blocks, the monitoring application may quickly determining the number of changed data blocks between any two data containers.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

The present invention may be implemented, in the illustrative embodiment, on a storage appliance that serves both file and block protocol access to information stored on storage devices in an integrated manner. In this context, the integrated storage appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation.

Figure 1:
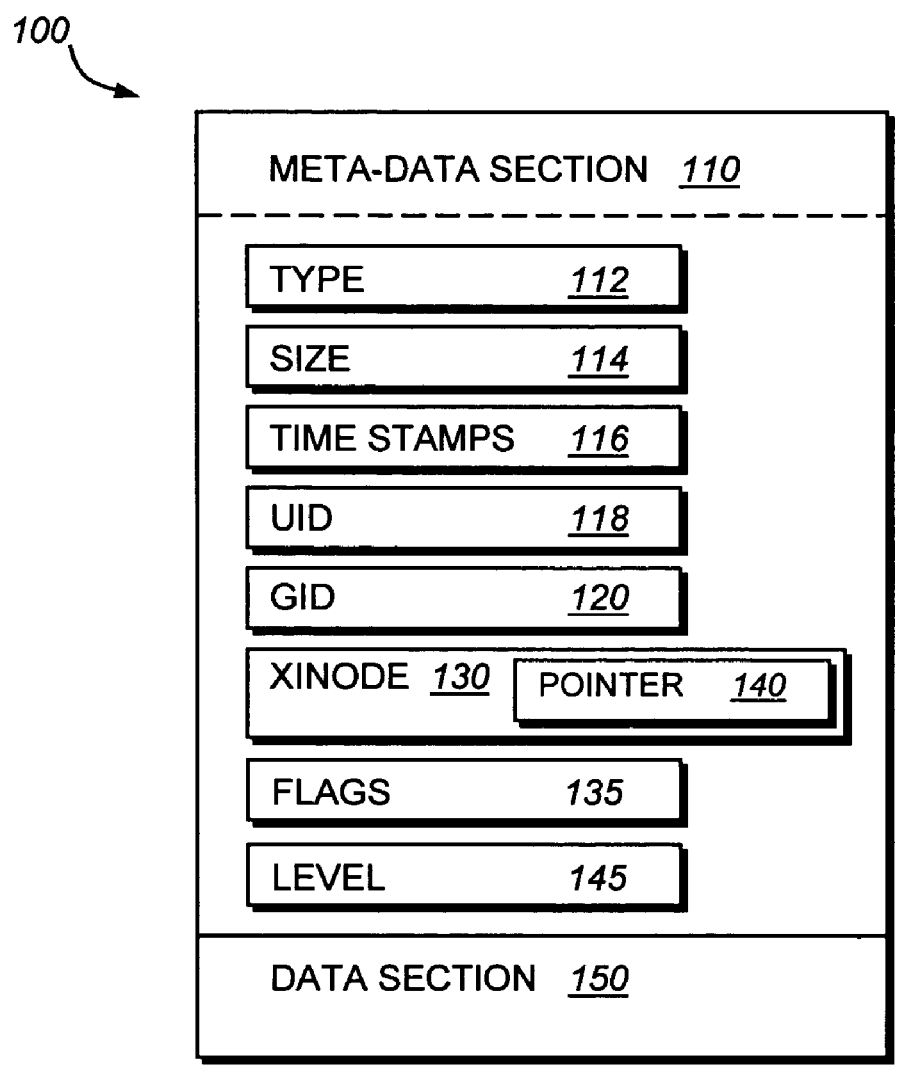
FIG. 1, already described, is a schematic block diagram of an exemplary inode data structure in accordance with an embodiment of the present invention.
Figure 2:
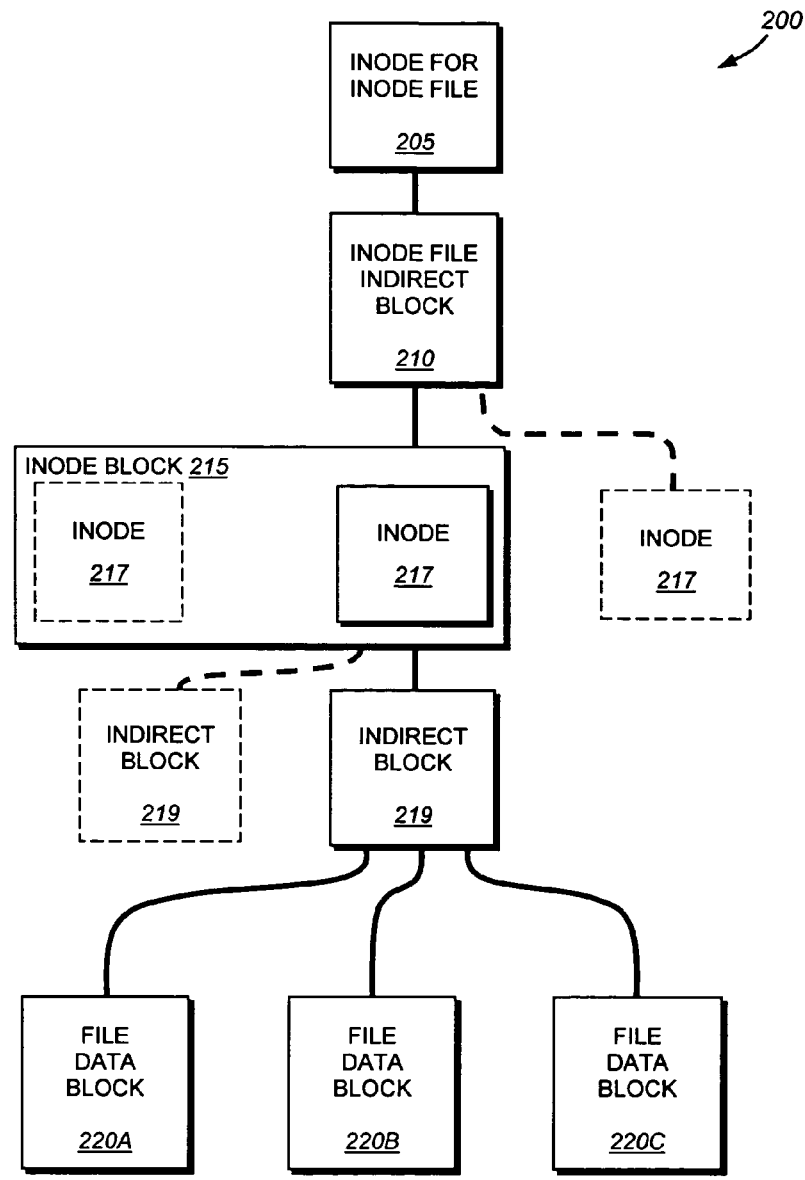
FIG. 2, already described, is a schematic block diagram of a buffer tree data structure in accordance with an embodiment of the present invention.
Figure 3:
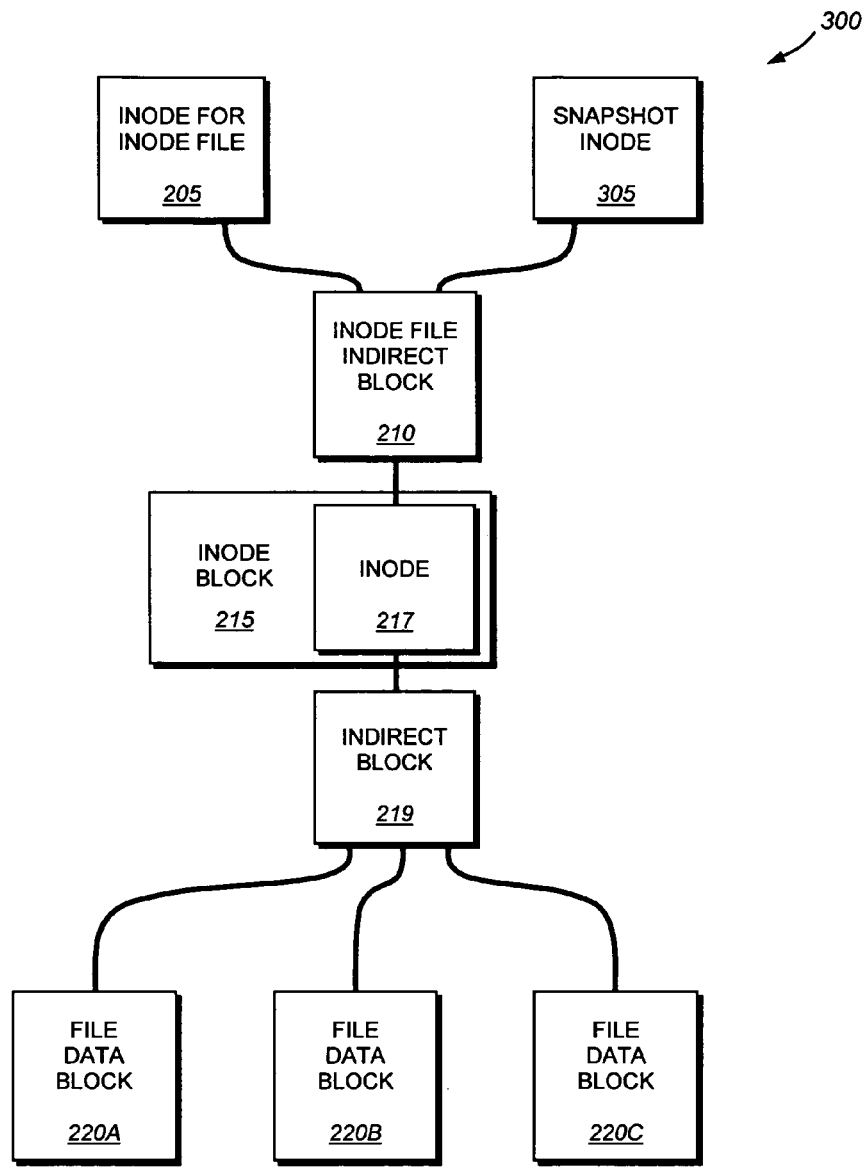
FIG. 3, already described, is a schematic block diagram of a buffer tree data structure showing a PCPI root inode in accordance with an embodiment of the present invention.
Figure 4:
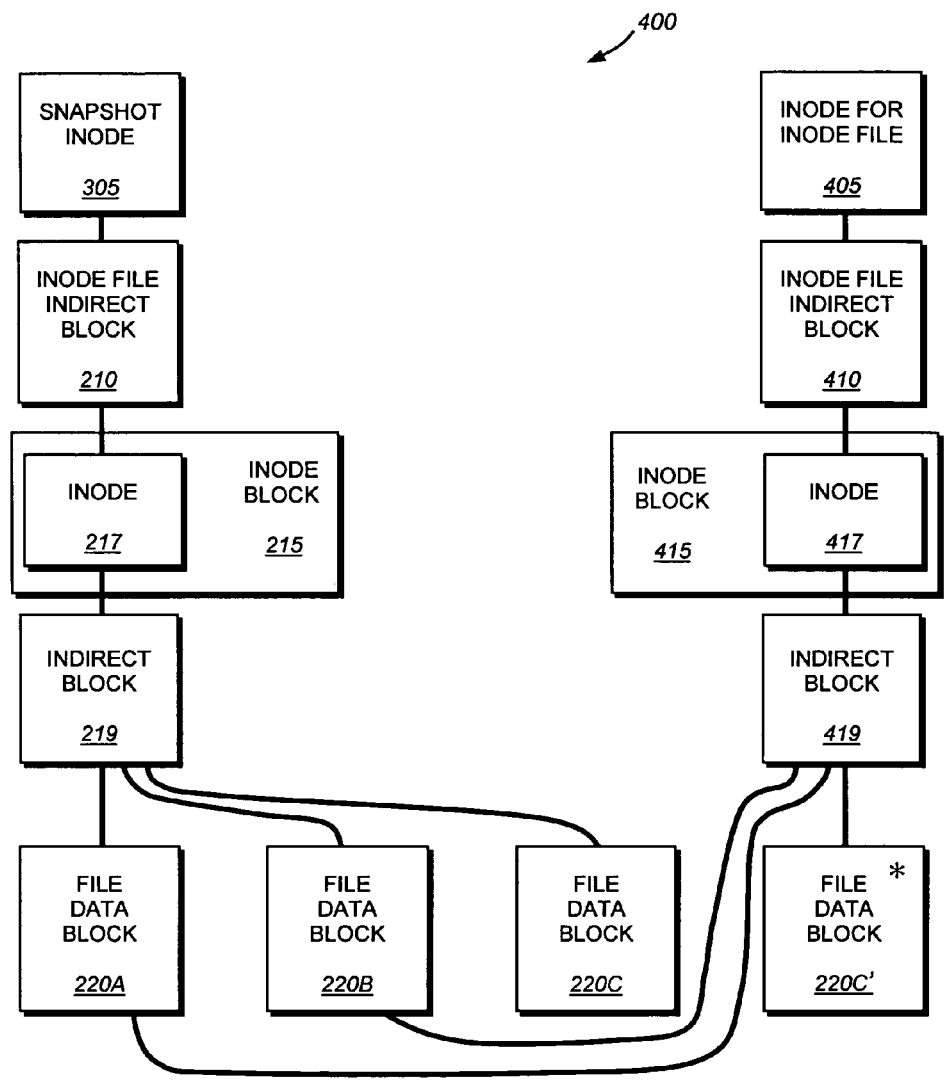
FIG. 4, already described, is a schematic block diagram of a buffer tree data structure showing a modified file after a PCPI in accordance with an embodiment of the pre-sent invention.
Figure 5:
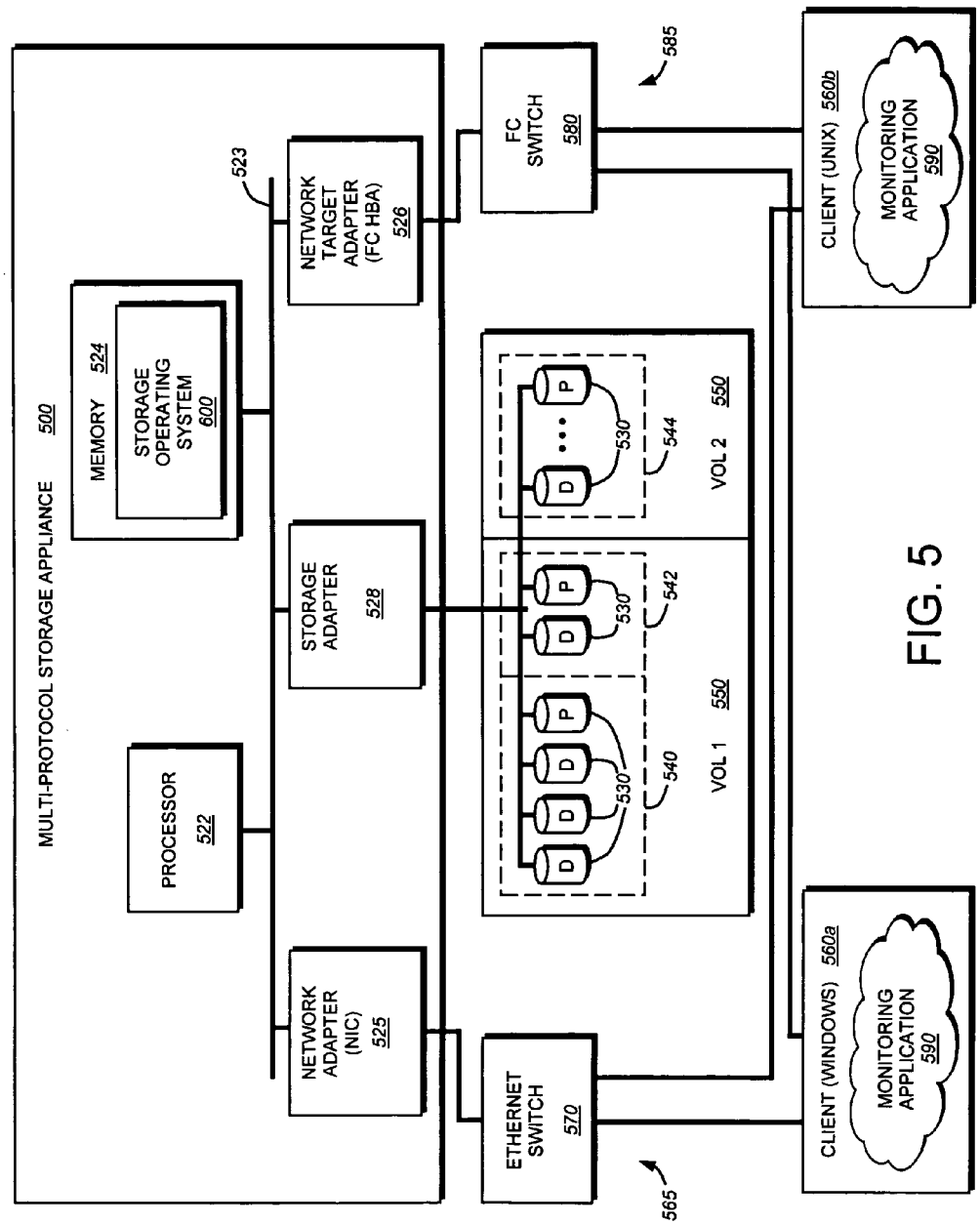
FIG. 5 is a schematic block diagram of an exemplary storage system in accordance with an embodiment of the present invention.

FIG. 5 is a schematic block diagram of storage appliance 500 configured to provide storage service relating to the organization of information on storage devices, such as disks 530. The storage appliance 500 is illustratively embodied as a storage system comprising a processor 522, a memory 524, a plurality of network adapters 525, 526 and a storage adapter 528 interconnected by a system bus 523. The multi-protocol storage appliance 500 also includes a storage operating system 600 that provides a virtualization system (and, in particular, a file system) to logically organize the information as a hierarchical structure of named directory, file and virtual disk (vdisk) storage objects on the disks 530.

Whereas clients of a NAS-based network environment have a unified storage viewpoint ("namespace") of files, the clients of a SAN-based network environment have a namespace of blocks or disks. To that end, the multi-protocol storage appliance 500 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these vdisks accessible to the SAN clients through controlled exports, as described further herein.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the storage appliance by, inter alia, invoking storage operations in support of the storage service implemented by the appliance.

The network adapter 525 couples the storage appliance to a plurality of clients 560a,b over point-to-point links, wide area networks, virtual private networks implemented over a public network (Internet) or a shared local area network, hereinafter referred to as an illustrative Ethernet network 565. Therefore, the network adapter 525 may comprise a network interface card (NIC) having the mechanical, electrical and signaling circuitry needed to connect the appliance to a network switch, such as a conventional Ethernet switch 570. For this NAS-based network environment, the clients are configured to access information stored on the multi-protocol appliance as files. The clients 560 communicate with the storage appliance over network 565 by exchanging discrete frames or packets of data according to pre-defined protocols, such as the Transmission Control Protocol/Internet Protocol (TCP/IP).

The clients 560 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 560 may request the services of the storage appliance 500 by issuing file access protocol messages (in the form of packets) to the appliance over the network 565. For example, a client 560a running the Windows operating system may communicate with the storage appliance 500 using the Common Internet File System (CIFS) protocol over TCP/IP. On the other hand, a client 560b running the UNIX operating system may communicate with the multi-protocol appliance using either the Network File System (NFS) protocol over TCP/IP or the Direct Access File System (DAFS) protocol over a Virtual Interface (VI) transport in accordance with a remote direct memory access (RDMA) protocol over TCP/IP. It will be apparent to those skilled in the art that other clients running other types of operating systems may also communicate with the integrated multi-protocol storage appliance using other file access protocols.

An example of an application executing on the client 560 is a monitoring application 590 that utilizes the novel vbnspace of the present invention to analyze the rate of change of level 0 data blocks in a file system. The monitoring application 590 may further utilize one of the conventional file-based protocols to retrieve files from the vbnspace namespace for, e.g., analysis purposes. The monitoring application 590 and its use with the novel vbnspace namespace is described further below.

The storage network "target" adapter 526 also couples the multi-protocol storage appliance 500 to clients 560 that may be further configured to access the stored information as blocks or disks. For this SAN-based network environment, the storage appliance is coupled to an illustrative Fibre Channel (FC) network 585. FC is a networking standard describing a suite of protocols and media that is primarily found in SAN deployments. The network target adapter 526 may comprise a FC host bus adapter (HBA) having the mechanical, electrical and signaling circuitry needed to connect the appliance 100 to a SAN network switch, such as a conventional FC switch 580. In addition to providing FC access, the FC HBA may offload Fibre Channel network processing operations for the storage appliance.

The clients 560 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 530, to attach to the storage appliance 500. In SCSI terminology, clients 560 operating in a SAN environment are initiators that initiate requests and commands for data. The storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 500 supports various SCSI-based protocols used in SAN deployments, including SCSI encapsulated over TCP (iSCSI) and SCSI encapsulated over FC (FCP). The initiators (hereinafter clients 560) may thus request the services of the target (hereinafter storage appliance 500) by issuing iSCSI and FCP messages over the network 565, 585 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 528 cooperates with the storage operating system 600 executing on the storage appliance to access information requested by the clients. The information may be stored on the disks 530 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 522 (or the adapter 528 itself) prior to being forwarded over the system bus 523 to the network adapters 525, 526, where the information is formatted into packets or messages and returned to the clients.

Storage of information on the appliance 500 is preferably implemented as one or more storage volumes (e.g., VOL1-2 550) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 550 is constructed from an array of physical disks 530 that are organized as RAID groups 540, 542, and 544. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 530, the storage operating system 600 implements a write-anywhere file system of a virtualization system that "virtualizes" the storage space provided by disks 530. The file system logically organizes the information as a hierarchical structure of named directory and file objects (hereinafter "directories" and "files") on the disks. Each "on-disk" file may be implemented as set of disk blocks configured to store information, such as data for the file. These data blocks are illustratively organized within a volume block number (vbn) space. The directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described U.S. patent application Ser. No. 10/216,453 entitled STORAGE VIRTUALIZATION BY LAYERING VDISKS ON A FILE SYSTEM, by Vijayan Rajan, et al.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX®D or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 6:
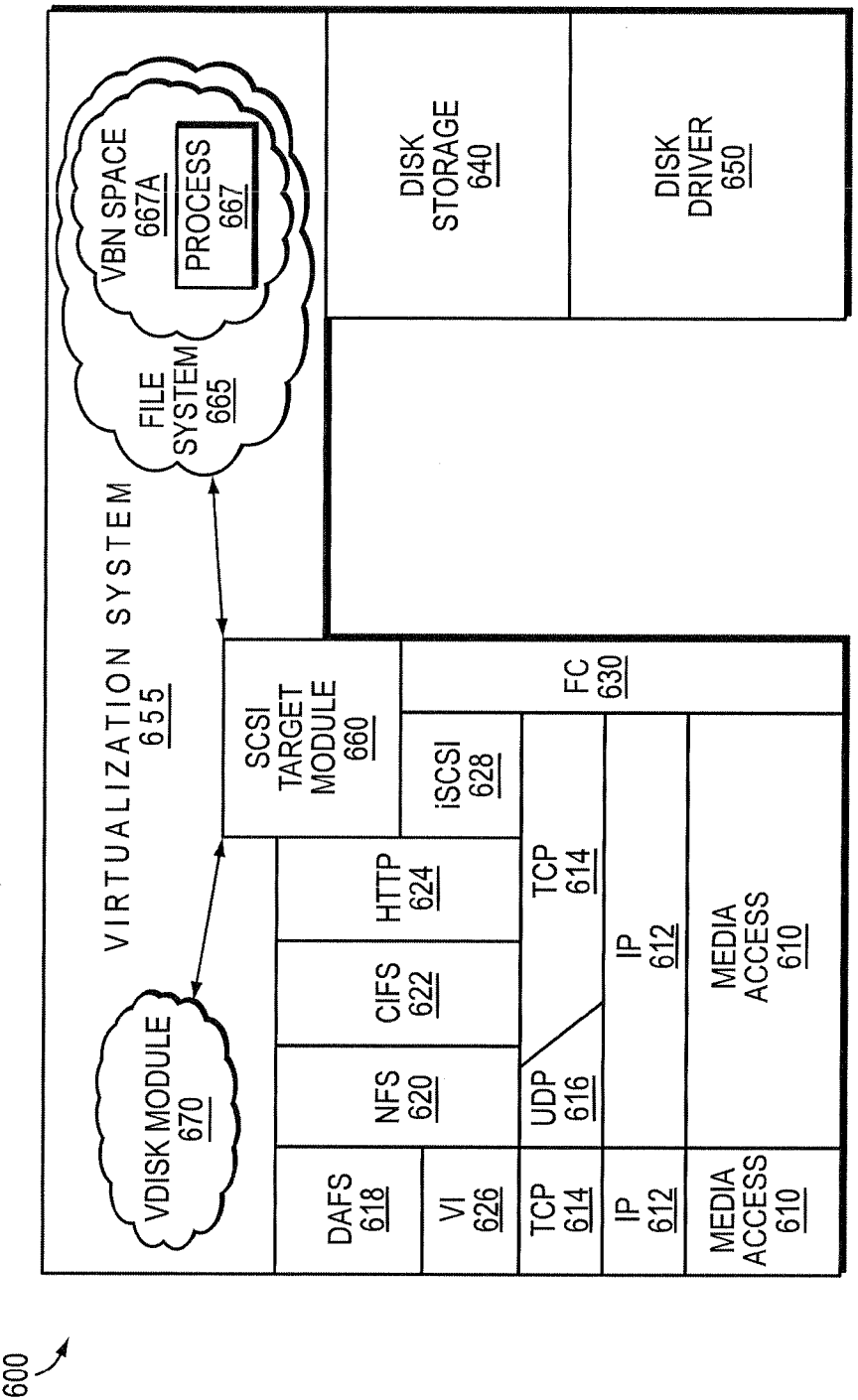
FIG. 6 is a schematic block diagram of an exemplary storage operating system for use with the storage system of FIG. 5 in accordance with an embodiment of the present invention.

FIG. 6 is a schematic block diagram of an exemplary storage operating system 600 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 610 of network drivers (e.g., gigabit Ethernet drivers) that interfaces to network protocol layers, such as the IP layer 612 and its supporting transport mechanisms, the TCP layer 614 and the User Datagram Protocol (UDP) layer 616. A file system protocol layer provides multi-protocol file access and, to that end, includes support for the DAFS protocol 618, the NFS protocol 620, the CIFS protocol 622 and the Hypertext Transfer Protocol (HTTP) protocol 624. A Virtual Interface (VI) layer 626 implements the VI architecture to provide direct access transport (DAT) capabilities, such as RDMA, as required by the DAFS protocol 618.

An iSCSI driver layer 628 provides block protocol access over the TCP/IP network protocol layers, while a FC driver layer 630 operates with the FC HBA 526 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 640 that implements a disk storage protocol, such as a RAID protocol, and a disk driver layer 650 that implements a disk access protocol such as, e.g., a SCSI protocol.

Bridging the disk software layers with the integrated network protocol stack layers is a virtualization system 655 that is implemented by a file system 665 cooperating with virtualization modules illustratively embodied as, e.g., vdisk module 670 and SCSI target module 660. It should be noted that the vdisk module 670, file system 665 and SCSI target module 660 can be implemented in software, hardware, firmware, or a combination thereof. The vdisk module 670 is layered on (and interacts with) the file system 665 to provide a data path from the block-based SCSI target module to blocks managed by the file system. In essence, the vdisk module 670 manages SAN deployments by, among other things, implementing a comprehensive set of vdisk (lun) commands issued through a user interface by a system administrator. These vdisk commands are converted to primitive file system operations ("primitives") that interact with the file system 665 and the SCSI target module 660 to implement the vdisks.

The SCSI target module 660, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 528, 530 and the file system 665 to thereby provide a translation layer of the virtualization system 655 between the SAN block (lun) space and the file system space, where luns are represented as vdisks.

The file system 665 illustratively implements the above-described WAFL file system having an on-disk format representation that is block-based using, e.g., 4 kilobyte (kB) blocks and using inodes to describe the files. The file system 665 includes a vbn space 667A including a vbnspace process 667 that implements the novel vbnspace namespace in accordance with an embodiment of the present invention. Notably, the vbn space process 667 illustratively implements an in-memory instantiation of the vbnspace namespace, as described further below. In alternate embodiments, the functionality of the vbn space process 667 may be integrated directly with the file system 665.

Broadly stated, all inodes of the file system are organized into the inode file. A file system (fs) info block specifies the layout of information in the file system and includes an inode of a file that includes all other inodes of the file system. Each volume has an fs info block that is preferably stored at a fixed location within, e.g., a RAID group of the file system. The inode of the root fs info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

It should be noted that the software "path" through the storage operating system layers described above needed to perform data storage access for the client request received at the multi-protocol storage appliance may alternatively be implemented in hardware. That is, in an alternate embodiment of the invention, a storage access request data path through the operating system layers (including the virtualization system 655) may be implemented as logic circuitry embodied within a field programmable gate array (FPGA) or an application specific integrated circuit (ASIC). This type of hardware implementation increases the performance of the storage service provided by appliance 500 in response to a file access or block access request issued by a client 560. Moreover, in another alternate embodiment of the invention, the processing elements of network and storage adapters 525-528 may be configured to offload some or all of the packet processing and storage access operations, respectively, from processor 522 to thereby increase the performance of the storage service provided by the multi-protocol storage appliance. It is expressly contemplated that the various processes, architectures and procedures described C. Determining Overwrites In Level 0 Data Blocks The present invention provides a system and method for quickly and efficiently determining the number of overwritten blocks between two data containers served by a storage system. An overwritten block is a block that has had data written to it, thereby causing the block to be written to the file system, even though the data written may be identical to the previous contents of the block. The number of overwritten blocks is determined by analyzing changes to level 0 data blocks in a file system executing on the storage system, which is configured to support PCPIs. A novel vbnspace namespace is provided that is "parallel" to the file system (the "active" file system) and tracks location information (i.e., indirect block pointers) of level 0 data blocks within each data container, e.g., the active file system or a PCPI. As used herein the term "namespace" denotes a unified view of storage resources on the storage system. The vbnspace namespace effectively eliminates the conventional level 0 data blocks from a storage viewpoint to thereby reduce the quantity of information needed to perform the rate of change analysis. This, in turn, reduces the time needed to retrieve such information. The vbnspace namespace is illustratively accessed via a novel vbnspace special directory from a root directory of the active file system and replicates the active file system and associated PCPIs. Thus a file, e.g., /foo/bar/file may be accessed in the vbnspace as /vbnspace/foo/bar/file.

The vbnspace namespace is generated in-memory by the storage appliance and modifies the levels of a buffer tree of each data container so that the level 1 indirect blocks of the active file system become vbnspace level 0 blocks. As a result, the "data" of the vbnspace data container comprises pointers to non-vbnspace level 0 data blocks. The vbnspace level 0 blocks of two different data containers may then be compared to determine the number of changed level 0 data blocks between the containers. A data container typically comprises fewer level 1 blocks (i.e., vbnspace level 0 blocks) than level 0 data blocks, e.g., illustratively by a factor of 510 or 1024. Accordingly, the computational time required to perform the vbnspace level 0 block comparison is reduced as compared to direct comparison of level 0 data blocks.

Figure 7:
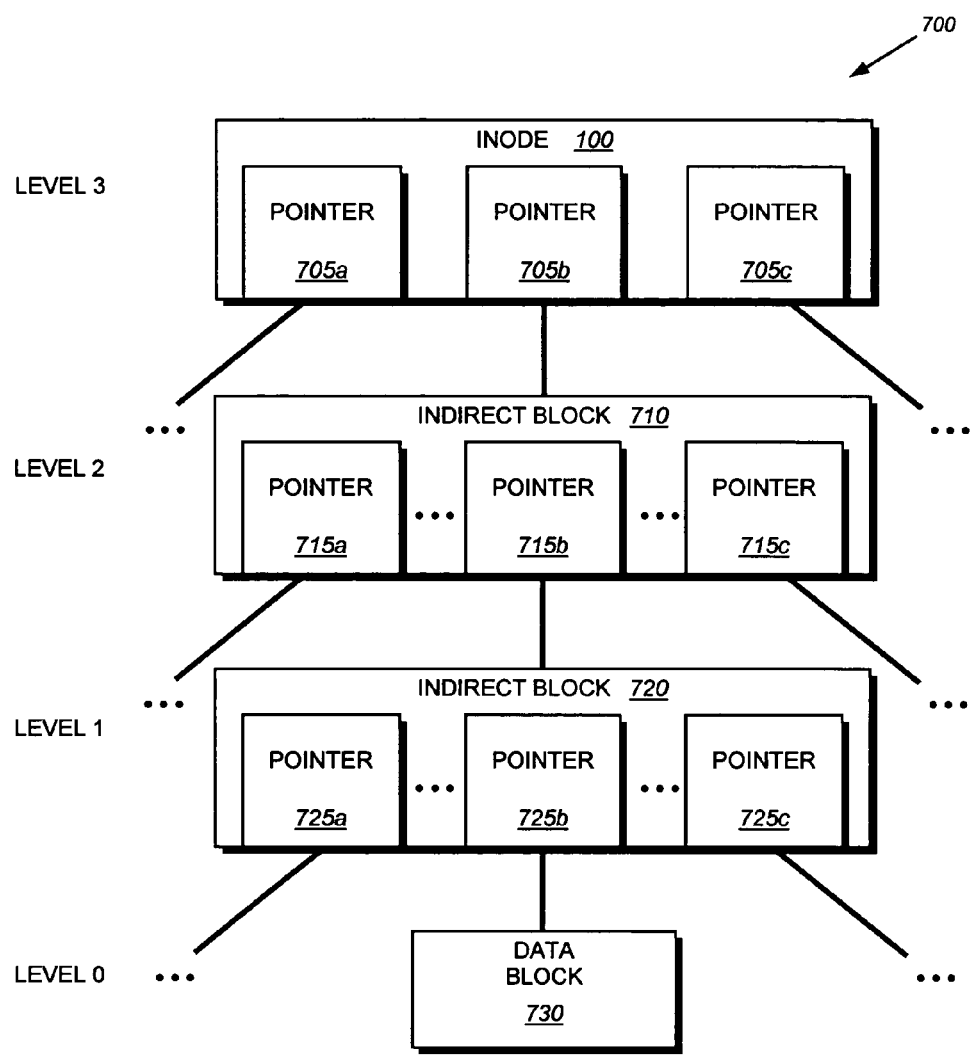
FIG. 7 is a schematic block diagram of an exemplary buffer tree in accordance with an embodiment of the present invention.

FIG. 7 is a schematic block diagram of an exemplary buffer tree 700 in accordance with an embodiment of the present invention. The buffer tree 700 is illustratively a level 3 buffer tree, having a level 0 data block indirectly referenced to by three higher level blocks. Inode 100 resides at level 3 of a data container represented by the buffer tree 700. The inode includes a plurality of pointers 705, each of which references (points to) a level 2 indirect block 710. Each level 2 indirect block 710, in turn, includes pointers 715 to level 1 indirect blocks 720. Each pointer 725 in level 1 indirect block 720 points to a data block 730, which comprises the level 0 data blocks of the buffer tree 700. As noted above in a conventional file system each indirect block 710, 720 may illustratively point to 510 or 1024 blocks. The number of pointers contained within any block of the file system is implementation specific, and, to that end, depends on file system design. As such, a block may have any number of pointers contained therein and still operate in accordance with the principles of the present invention. The greater the number of pointers in each level, the greater the benefit of using these principles, as the number of blocks to be retrieved (loaded) from disk is reduced to 1/N of the total number of data blocks, wherein N is the number of pointers per block. Thus, the level 2 indirect block 710 may contain up to 1024 pointers 715 to level 1 indirect blocks 720. Similarly, indirect block 720 may contain up to 1024 pointers 725. To perform a conventional analysis of the rate of change of data, the buffer tree 700 would need to read each individual data block 730 accessed from disk from both of the data containers being compared. As noted, this is a computationally and disk storage subsystem intensive operation and the present invention is directed to reducing the intensity of such an operation.

Figure 8:
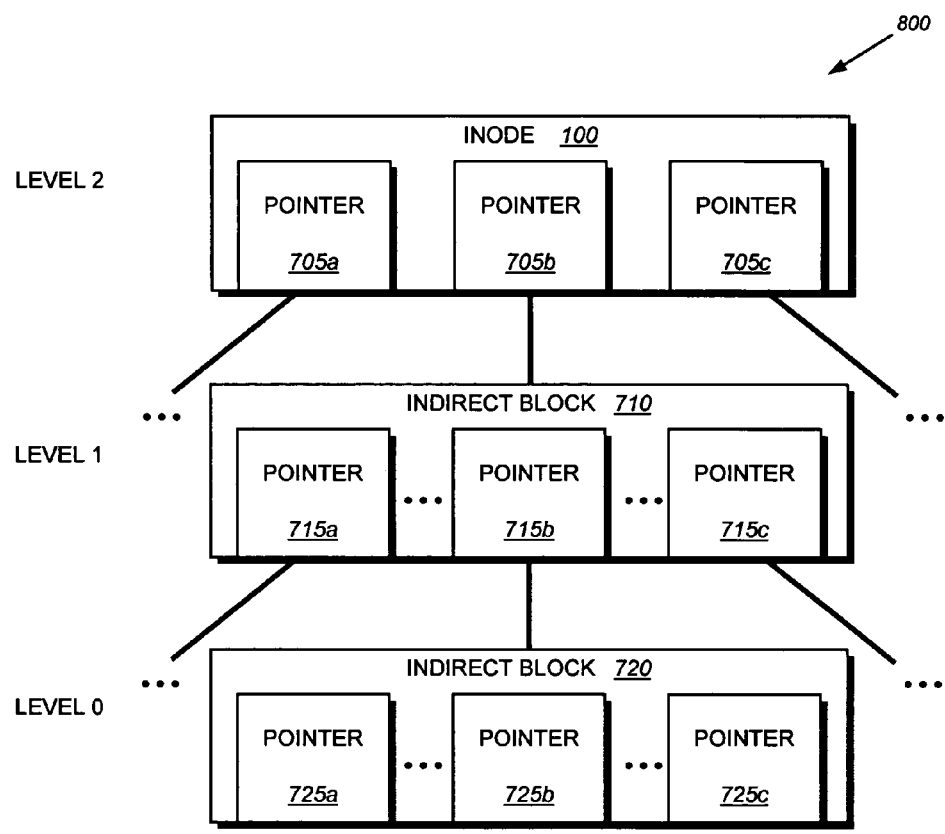
FIG. 8 is a schematic block diagram of an exemplary buffer tree in the vbnspace in accordance with an embodiment of the present invention.

FIG. 8 is a schematic block diagram of an exemplary buffer tree 800 within the novel vbnspace namespace of the present invention. It should be noted that buffer tree 800 of the vbnspace namespace represents the same data container as shown in buffer tree 700 (FIG. 7). However, in accordance with the principles of the present invention, the file system (or vbnspace process 667 located therein) has eliminated one level from the buffer tree, such that inode 100 comprises a vbnspace level 2 block. The inode 100 contains a plurality of pointers 705, each of which points to a vbnspace level 1 indirect block 710. The vbnspace level 1 indirect block, in turn, comprises a plurality of pointers 715, each of which points to a vbnspace level 0 indirect block 720. Stored within the vbnspace level 0 block 720 is a plurality of pointers 725, wherein each pointer 725 represents a vbn of the conventional level 0 data block 730 from FIG. 7.

However, in accordance with the illustrative embodiment the vbnspace level 0 blocks are viewed as data blocks within the vbnspace namespace. Thus, to determine if any changes have occurred between two data containers, the vbnspace level 0 blocks may be compared directly. Any changes between the vbnspace level 0 blocks of the two data containers signifies a change in a conventional level 0 data block 730, i.e., a change to a pointer to a conventional level 0 data block. As an administrator is typically concerned with the rate of change, but not necessarily in the actual data changes themselves, the present invention provides a technique for quickly and efficiently determining the changes between two data containers.

Figure 9:
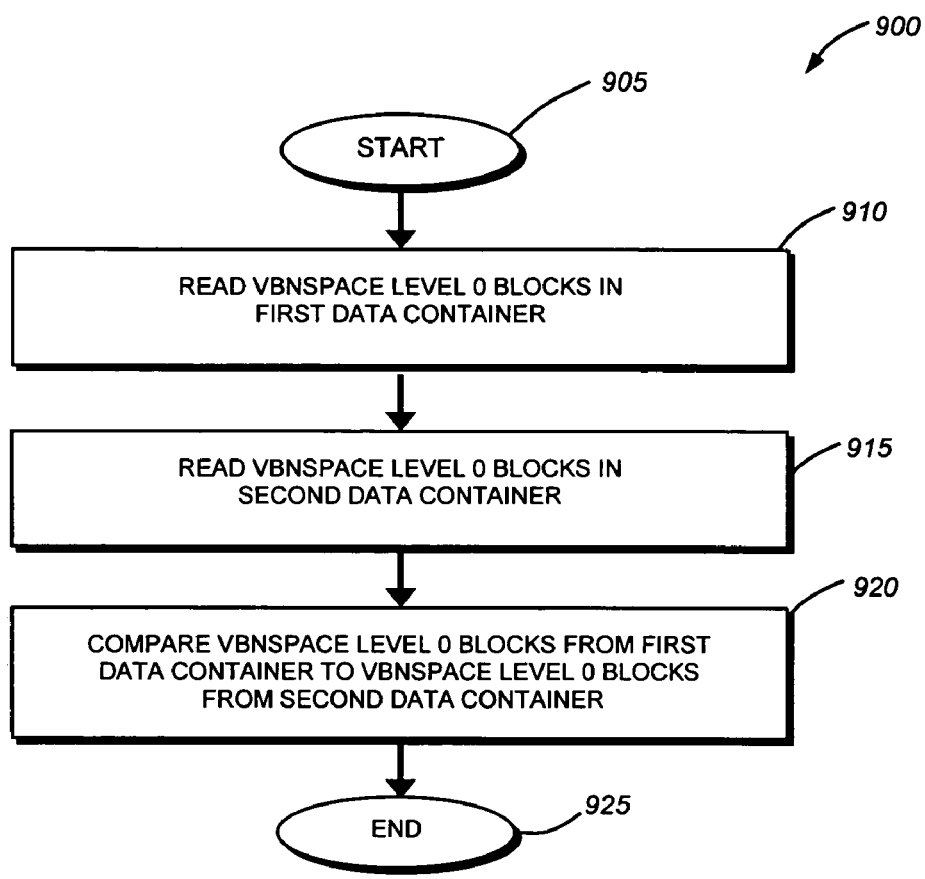
FIG. 9 is a flowchart of the steps of a procedure for analyzing level 0 data block overwrites in accordance with an embodiment of the present invention.

FIG. 9 is a flowchart detailing the steps of a procedure 900 for analyzing level 0 data block overwrites between two data containers in a file system in accordance with an embodiment of the present invention. The procedure 900 begins in step 905 and continues to step 910 where the vbnspace level 0 blocks in a first data container are retrieved (read). These vbnspace level 0 data blocks may be read using conventional file-level protocols, such as NFS directed to the first data container. For example, an NFS read operation to retrieve the first 4 KB of the data container, such as a file, in the vbnspace results in the retrieval of a first vbnspace level 0 block, which corresponds to a conventional level 1 block. Illustratively, this vbnspace level 0 block contains 1024 pointers as data. In step 915, the vbnspace level 0 blocks in the second data container are read, again using conventional file-level protocol operations.

Once the vbnspace level 0 blocks in the first and second data container have been read, the monitoring application compares the vbnspace level 0 blocks from the first data container with the vbnspace level 0 blocks from the second data container in step 920. Any changes resulting from this comparison between the containers' vbnspace level 0 blocks signify an overwrite of at least one level 0 block in one of the data containers. As noted above, each vbnspace level 0 data block typically contains 510 or 1024 pointers. In accordance with the invention, the number of vbnspace level 0 blocks retrieved for each data container is illustratively 1/510 or 1/1024 of the number required for conventional comparison of level 0 data blocks. Once the comparison is performed in step 920, the results may be utilized for a variety of administrative functions. The procedure then completes in step 925. In alternate embodiments, the procedure 900 may be modified to only read a certain number of vbnspace level 0 blocks from each data container before comparing them. In such an alternate embodiment, procedure 900 is repeated until all of the vbnspace level 0 blocks of the data containers have been read and compared.

In the illustrative embodiment, the procedure 900 is implemented by the monitoring application 590 executing on client 560. During the comparison step 920, the monitoring application tracks the number of changed pointers contained within the vbnspace level 0 blocks, each of which represents a change to a conventional level 0 block. Analysis of the number of overwritten pointers in the vbnspace level 0 blocks leads to a rate of change determination. To determine the rate of change, a simple formula may be utilized; for example, [Number of Overwritten Blocks]/[Time Unit Between Creation of The Data Containers] provides a rate of change in blocks per unit time between the two data containers.

To again summarize, the present invention is directed to a system and method for determining the number of overwritten level 0 data blocks in a file system. A vbnspace namespace is provided that is parallel to the active file system. Data containers, including files and/or PCPIs, accessed through the vbnspace are modified in-memory so that their buffer tree structures are decreased by one level from their sizes in the non-vbnspace file system. Thus, the level 1 blocks, of a conventional file system, which contain pointers to the direct data blocks, are transformed to vbnspace level 0 blocks. This transformation permits rapid analysis and detection of change between two data containers by analyzing the vbnspace level 0 blocks of the containers. Since the vbnspace level 0 blocks of each data container comprise pointers to conventional level 0 blocks, each change in conventional level 0 blocks is represented by a pointer change in the vbnspace level 0 blocks. As noted, each vbnspace level 0 block typically contains several orders of magnitude fewer blocks then the number of conventional level 0 blocks; accordingly, the time required to perform a rate of change an analysis is substantially reduced.

While this description has been written in terms of determining rates of change between data containers, the novel vbnspace may be utilized for other purposes, such as an "easy to use" interface into the pointers to the level 0 data blocks. For example, a file system tuning application may utilize the exposed block pointer information for tuning or optimization purposes.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system for determining a number of overwritten blocks modified between a first time when a first data container was written and a second time when a second data container was written by a storage system, comprising:

a storage operating system executed by a processor, the storage operating system configured to implement a file system having a vbnspace process, the vbnspace process adapted to implement a parallel namespace to the file system, the parallel namespace adapted so that level one blocks of each data container are presented as level zero blocks, wherein the level one blocks comprise one or more pointers to the level zero blocks; and the storage operating system further configured to determine a number of changed data blocks between the first data container and the second data container by comparing level one blocks of the storage system which are presented as level zero blocks of the vbnspace to compare the pointers of the storage system level one blocks of the first data container and the second data container.

2. The system of claim 1 wherein the data container comprises a persistent consistency point image.

3. The system of claim 1 wherein the data container comprises an active file system.

4. The system of claim 1 wherein each level one block comprises 510 pointers to level zero blocks.

5. The system of claim 1 wherein each level one block comprises 1024 pointers to level zero blocks.

6. The system of claim 1 wherein a data container may be accessed via the parallel namespace using a file-level protocol.

7. The system of claim 1 wherein a file-level protocol comprises NFS.

8. The system of claim 1 wherein a data container may be accessed via the parallel namespace using a block-level protocol.

9. The system of claim 8 wherein the block-level protocol comprises SCSI encapsulated within Fibre Channel (FCP).

10. The system of claim 8 wherein the block-level protocol comprises SCSI encapsulated within TCP/IP (iSCSI).

11. The system of claim 1 further comprising a monitoring application executing on a client, the monitoring application configured to determine the rate of change between a first data container and a second data container by comparing level zero blocks of each data container in the parallel namespace.

12. A system for determining a number of overwritten blocks modified between a first time when a first data container was written and a second time when a second data container was written by a storage system, comprising:
    a storage operating system executed by a processor, the storage operating system implementing a file system having means for implementing a parallel namespace to the file system, the means for implementing the parallel namespace comprising means for presenting level one blocks of each data container as level zero blocks, wherein the level one blocks comprise one or more pointers to the level zero blocks; and
    a number of changed data blocks between the first data container and the second data container determined by comparing level one blocks of the storage system which are presented as level zero blocks of the vbnspace to compare the pointers of the storage system level one blocks of the first data container and the second data container.

13. The system of claim 12 wherein the data container comprises a persistent consistency point image.

14. The system of claim 12 wherein the data container comprises an active file system.

15. The system of claim 12 wherein each level one block comprises 510 pointers to level zero blocks.

16. The system of claim 12 wherein each level one block comprises 1024 pointers to level zero blocks.

17. The system of claim 12 wherein a data container may be accessed via the parallel namespace using a file-level protocol.

18. The system of claim 12 wherein a file-level protocol comprises NFS.

19. The system of claim 12 wherein a data container may be accessed via the parallel namespace using a block-level protocol.

20. A method for determining a number of overwritten level zero blocks between a first data container and a second data container served by a storage system, comprising:
    pointing by pointers in level one blocks of the storage system to data in level zero blocks of the storage system;
    providing a vbnspace namespace having the level one blocks of the storage system presented as vbnspace level zero blocks;
    retrieving vbnspace level zero blocks of the first data container from one or more storage devices coupled to the storage system;
    retrieving vbnspace level zero blocks of the second data container from the one or more storage devices; and
    comparing the vbnspace level zero data blocks of the first data container to the vbnspace level zero data blocks of the second data container to determine a number of storage system level zero blocks that differ between the first data container and the second data container, whereby pointers in the level one blocks of the storage system are compared.

21. The method of claim 20 wherein the first data container comprises a persistent consistency point image.

22. The method of claim 20 wherein the first data container comprises an active file system.

23. The method of claim 20 wherein the second data container comprises a persistent consistency point image.

24. The method of claim 20 wherein the second data container comprises an active file system.

25. The method of claim 20 wherein the storage devices comprise disk drives.

26. A system for determining a number of overwritten level zero blocks between a first data container and a second data container served by a storage system, comprising:
    means for pointing by pointers in level one blocks of the storage system to data in level zero blocks of the storage system;
    means for providing a vbnspace namespace having the level one blocks of the storage system presented as vbnspace level zero blocks;
    means for retrieving vbnspace level zero blocks of the first data container from one or more storage devices coupled to the storage system;
    means for retrieving vbnspace level zero blocks of the second data container from the one or more storage devices; and
    a storage operating system executed by a processor, the storage operating system configured to compare the vbnspace level zero data blocks of the first data container to the vbnspace level zero data blocks of the second data container to determine a number of storage system level zero blocks that differ between the first data container and the second data container, whereby pointers in the level one blocks of the storage system are compared.

27. The system of claim 26 wherein the first data container comprises a persistent consistency point image.

28. The system of claim 26 wherein the first data container comprises an active file system.

29. The system of claim 26 wherein the second data container comprises a persistent consistency point image.

30. The system of claim 26 wherein the second data container comprises an active file system.

31. The system of claim 26 storage devices comprise disk drives.

* * * * *

UNITED STATES PATENT AND TRADEMARK OFFICE
CERTIFICATE OF CORRECTION

PATENT NO. : 7,506,111 B1
APPLICATION NO. : 11/017026
DATED : March 17, 2009
INVENTOR(S) : Eric Hamilton It is certified that error appears in the above-identified patent and that said Letters Patent is hereby corrected as shown below:

Col. 3, Line 44, please amend as shown:

ers to inode blocks 215, each typically[[ contain ing]] containing multiple

Col. 9, Line 62, please amend as shown:

such as UNIX®[[D]] or Windows NT®, or as general-purpose

Signed and Sealed this

Ninth Day of November, 2010

David J. Kappos
*Director of the United States Patent and Trademark Office*